Patented Mar. 17, 1953

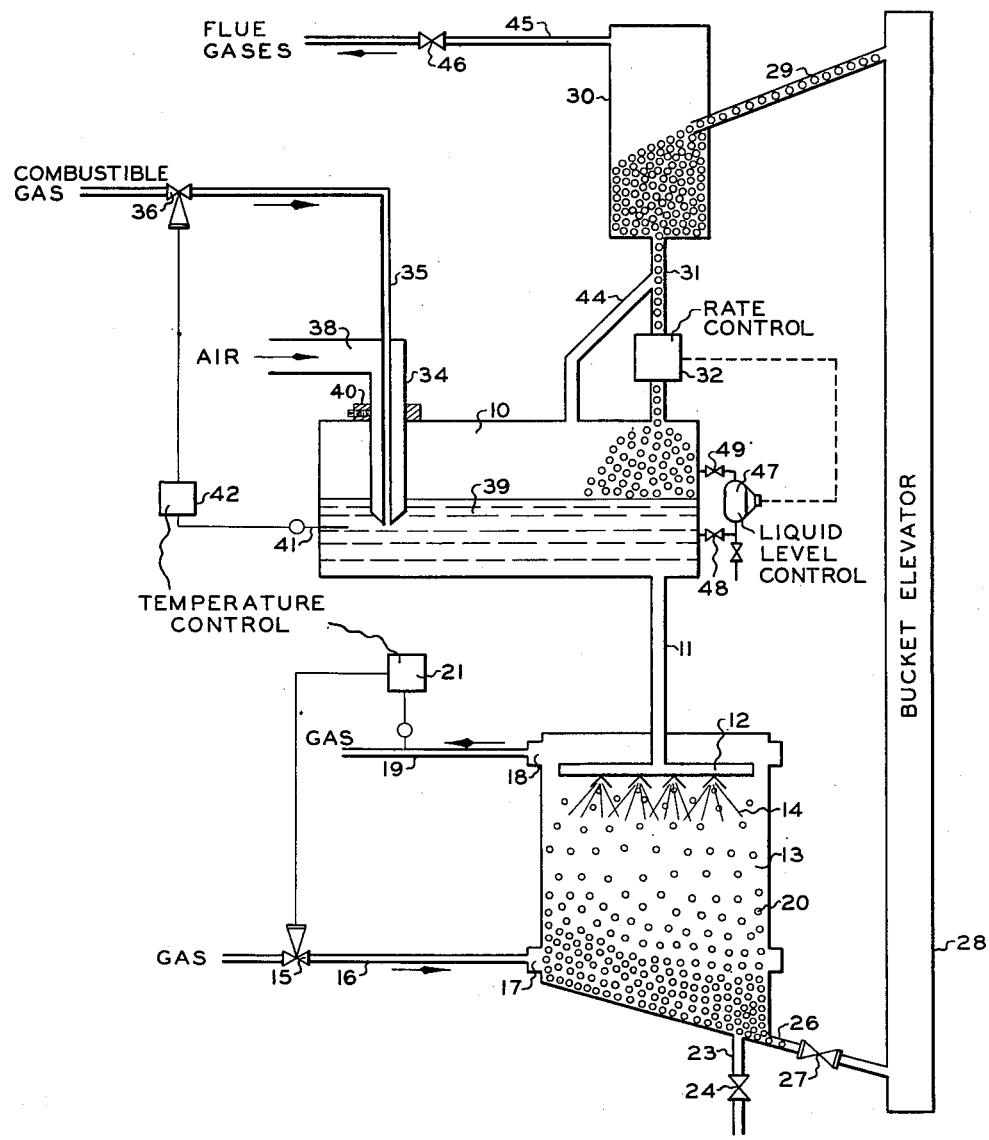

2,631,835

UNITED STATES PATENT OFFICE 2,631,835

APPARATUS FOR HEATING GASES

Edward L. Jones, Bartlesville, Okla., assignor to Phillips Petroleum Company, a corporation of Delaware Application April 26, 1948, Serial No. 23,246

4 Claims. (Cl. 263—19)

This invention relates to a method of heating gases. In another aspect it relates to heat exchange apparatus for efficiently transferring heat to gaseous substances.

It is an object of the invention to provide an improved method of and apparatus for transferring heat to gas or vapor streams.

It is a further object of the invention to provide heat exchange apparatus having an extremely high transfer efficiency.

It is a still further object of the invention to provide heat exchange apparatus in which high pressures are confined to one chamber, which is free from abrasion problems, and which utilizes an inexpensive heat exchange medium.

Various other objects, advantages and features of the invention will become apparent from the following detailed description taken in conjunction with the accompanying drawing, in which:

The figure is a schematic diagram illustrating the apparatus of my invention.

In accordance with this invention, countercurrent movement is effected between a stream of gas to be heated and a stream of hot, molten, heat exchange material, these streams being contacted for a sufficient length of time to solidify the heat exchange material. As a result, an efficient transfer of heat is obtained and the temperature of the gas is raised not only by the temperature differential between the heat exchange material and gas but also by the latent heat of fusion of the heat exchange material. The solid material from the countercurrent heat exchange unit is fed to a preheater and, thence, to a chamber wherein the preheated material is liquefied. The liquified material is then recycled to the heat exchange unit. The heat of combustion of the fuel used to liquefy the heat exchange material is efficiently transferred thereto by a submerged burner and the flue gases resulting from combustion of the fuel are fed to the preheater wherein they are used to raise the temperature of the solid material fed from the countercurrent heat exchange unit.

Referring now to the drawing in detail, a melting chamber 10 is provided for liquefying the heat exchange material which is fed from the bottom of the chamber 10 through a conduit 11 to a spray device 12 mounted within a heat exchange chamber 13. Preferably and advantageously, the stream of liquid 14 emerging from the spray device is fed downwardly through the chamber 13 by gravity. As the stream of liquid heat exchange material 14 descends in the chamber 13, it flows countercurrently with respect to a stream of relatively cool gas, such as a hydrocarbon gas, which is fed to the bottom portion of the chamber 13 through a pressure regulator valve 15, a conduit 16, and an annular port 17. The gas flows upwardly through chamber 13 to an annular port 18 which communicates with an outlet line 19. The molten heat exchange material thus contacts the gas stream countercurrently and raises the temperature thereof by an amount which is proportional to the temperature difference between the hot liquid material and the gas. This heat exchange causes the liquid material to solidfy and form small pebbles 20 which fall to the bottom of the chamber 13 and progressively increase in size as they approach the bottom of the chamber. As the liquid material solidifies, it gives up its latent heat of fusion to the gas and thereby further increases the temperature thereof.

A portion of the heated gas emerging through outlet 19 passes into a temperature control device 21 which operates valve 15 in a known manner and thereby regulates the inlet pressure in such fashion as to maintain a constant gas temperature at outlet 19. It will be apparent that, when the quantity of gas entering inlet 16 is increased, the temperature rise caused by the action of the heat exchange material will be decreased and, conversely, when the amount of gas is decreased, it will be raised to a higher temperature, the function of the temperature control 21 being to regulate the gas pressure so that a proper quantity thereof enters the chamber 13 to provide a constant outlet temperature for the gas.

In order to remove the solid material from the chamber, I may provide an outlet 23 at the bottom thereof which is controlled by a valve 24. This outlet, however, is used only when it is desired to clean out the chamber. Ordinarily, the solid material flows by gravity through an outlet 26 and a gate valve 27 to a bucket elevator 28. The solid particles are raised by the elevator and fed through a conduit 29 to a preheater chamber 30 from which they flow by gravity through a conduit 31 and a rate control 32 to the melting tank 10.

The preheated material in the chamber 10 is melted by a burner 34 which includes a fuel pipe 35 controlled by an automatic valve 36, together with an air inlet tube 38. Since air needed for the combustion of the fuel gases emerging through tube 35 is supplied by the conduit 38, the burner may be submerged in the molten material 39 and suitable means, such as a bearing structure 40 and suitable locking means, are provided for permitting the raising and lowering of the burner 34 in the chamber so that it may be submerged to the proper depth. A thermocouple 41, which is responsive to the temperature of the liquid 39, is connected to a temperature control unit 42 which regulates automatic valve 36, thereby controlling the supply of combustible gas to the burner 34 so as to maintain the liquid 39 at a substantially constant predetermined temperature. The flue gases resulting from the fuel combustion in burner 34 rise through the liquid 39 and pass into a conduit 44 which leads to the preheater unit 30 wherein the flue gases heat the solid heat exchange material emerging from the conduit 29. The flue gases are discharged from the preheater unit 30 through a conduit 45 which is controlled by a valve 46.

A liquid level control unit 47 is connected through a valve 48 to the lower portion of chamber 10 and through a valve 49 to the upper portion of the chamber 10. This control unit actuates the rate controller 32 and controls the flow of heat exchange material from the preheater unit 30 into the chamber 10 so as to maintain the liquid 39 at a constant predetermined level.

The complete operation of the apparatus will now be apparent to those skilled in the art. Molten heat exchange material, which may advantageously consist of sodium carbonate, passes by gravity from chamber 10 through conduit 11 to the spray device 12, thereby providing a stream of liquid heat exchange material which flows countercurrently to the gas entering the chamber 13 through inlet 16 and annular port 17. During this countercurrent flow, the liquid heat exchange material is solidified so that the gas temperature is raised both by the latent heat of fusion of the heat exchange material and by the heat flow due to the temperature differential between the heat exchange material and the gas. The heated gas is then discharged through port 18 and outlet 19. In this fashion, the chemical energy of the fuel flowing through burner 34 is completely and efficiently transferred to the hydrocarbon or other gases passing through chamber 13. This results from the fact that the burner 34 is submerged and, hence, practically all of the heat of combustion of the fuel is transferred to the heat exchange material 39 in the chamber 10. The heat of the liquid 39, in turn, is effectively transferred to the gas passing through chamber 13 due to the countercurrent flow in chamber 13 and due to the solidification of the heat exchange material in this chamber. The temperature of the gas in chamber 13 may be raised from 100° F. to 1700° F. while molten heat exchange material at 1700° F. may be cooled in chamber 13 so that the solid material discharged through conduit 26 has a temperature of about 100° F.

The solid materials passing through conduit 26 are lifted by elevator 28 and discharged through conduit 29 into the preheater chamber 30 wherein a substantially complete heat exchange occurs between the relatively cold solid material and the hot flue gases resulting from the combustion of the fuel in chamber 10. In this fashion, both the heat of combustion of the fuel and the heat present in the hot flue gases are utilized to raise the temperature of the hydrocarbon gas passing through chamber 13.

The disclosed system has a number of important advantages. If sodium carbonate is used, the total cost of heat exchange material is considerably reduced since sodium carbonate is considerably cheaper than the refractory pebbles utilized in previously known heat exchange units. Although the specific heat of sodium carbonate is comparable to that of the refractory pebbles, the sodium carbonate is more efficient in the present system since advantage is taken of the latent heat of fusion during the heat transfer process. In addition, carbon deposits upon the solid heat exchange material do not cause difficulty since, if such deposits are formed, they are burned off by the hot flue gas passing countercurrently to the solid heat exchange material in the preheater unit 30. The use of sodium carbonate as the heat transfer material prevents abrasion from being a serious problem, there is no possibility of spalling the heat transfer medium, and no difficulties are caused by the presence of fine particles.

The chambers and conduits of the heat exchange apparatus may conveniently be formed from ordinary stainless steel and this effectively prevents leakage at the joints of the apparatus and permits the use of sufficient pressure in chamber 13 that the pebbles may be readily removed through conduit 23 and valve 24 by the introduction of high pressure gas into the chamber. Further, in this apparatus, high pressures may be confined to the chamber 13 rather than being used throughout the whole apparatus, as in many previously known devices. Due to the countercurrent flow of gas and heat exchange material, the heat transfer is very rapid and efficient.

In some cases, I contemplate that the burner 34 may be replaced by a conduit for introducing hot flue gases into the chamber 10 from another operation carried out in connection with the present heat exchange apparatus. Excellent results may be obtained in this manner although the heat transfer is not so efficient as that obtained by the use of the submerged burner. In this aspect of my invention, it is to be understood that I contemplate the use of any known method of liquefying the solid heat exchange material although particular advantages are obtained by the use of the disclosed submerged burner. I also contemplate that the apparatus of this invention may be used for steam generation and heating provided that a heat exchange material is used that is insoluble in water. As regards the heat exchange material, any inert substance may be used which has a melting point intermediate the temperatures of the incoming and outgoing gases of chamber 13, although I prefer the use of materials such as sodium carbonate which have a substantially high specific heat and a high latent heat of fusion.

While the invention has been described in connection with a present, preferred embodiment thereof, it is to be understood that this description is illustrative only and is not intended to limit the invention, the scope of which is defined by the appended claims.

Having described my invention, I claim:

1. Heat exchange apparatus comprising, in combination, a chamber for receiving solid heat exchange material, a burner for melting said material in said chamber, a second chamber, a spray device mounted in said second chamber, means for conveying the liquid heat exchange material from said first chamber to said spray device to direct a stream of molten material into said second chamber, a gas inlet and a gas outlet communicating with said second chamber for causing a stream of gas to flow countercurrently with respect to said stream of liquid heat exchange material, and means for conveying solid heat exchange material from said second chamber to said first chamber.

2. Heat exchange apparatus comprising, in combination, a chamber for receiving solid heat exchange material, a burner for melting said material, a second chamber, a spray device mounted in the top portion of said second chamber, a gas outlet and a gas inlet communicating, respectively, with the top and bottom portions of said second chamber, means for conveying liquid heat exchange material from said first chamber to said spray device, and means for conveying solid heat exchange material from the bottom portion of said second chamber to said first chamber.

3. Heat exchange apparatus comprising, in combination, a chamber for receiving solid heat exchange material, a burner protruding into said chamber for melting said heat exchange material, said burner being vertically adjustable in said chamber to permit progressive liquefication of said heat exchange material, a second chamber, a spray device mounted in the top portion of said second chamber, a gas outlet and a gas inlet communicating, respectively, with the top and bottom portions of said second chamber, means for conveying liquid heat exchange material from said first chamber to said spray device, and an elevator for conveying solid heat exchange material from the bottom portion of said second chamber to the top portion of said first chamber.

4. Heat exchange apparatus comprising, in combination, a melting chamber for receiving solid heat exchange material, a burner for melting the heat exchange material in said chamber, a spray chamber having a spray device mounted in the top portion thereof, a gas outlet and a gas inlet communicating, respectively, with the top and bottom portions of said spray chamber, means for conveying liquid heat exchange material from the bottom portion of said first chamber to said spray device, a preheating chamber, means for conveying solid heat exchange material from the bottom portion of said spray chamber to said preheating chamber, means for conveying heat exchange material from said preheating chamber to said melting chamber, and means for admitting flue gases from the melting chamber to said preheating chamber.

EDWARD L. JONES.

REFERENCES CITED

The following references are of record in the file of this patent:

UNITED STATES PATENTS

| Number | Name | Date |
| --- | --- | --- |
| 629,520 | Mond | July 25, 1899 |
| 1,046,307 | Kind | Dec. 3, 1912 |
| 1,738,270 | Zellhoefer | Dec. 3, 1929 |
| 1,905,185 | Morris | Apr. 25, 1933 |
| 2,244,612 | Crowley, Jr. | June 3, 1941 |
| 2,417,049 | Bailey et al. | Mar. 11, 1947 |